United States Patent
Osafune et al.

(10) Patent No.: US 8,155,813 B2
(45) Date of Patent: Apr. 10, 2012

(54) CONTROL DEVICE FOR VESSEL EQUIPPED WITH EXHAUST HEAT RECOVERY SYSTEM AND THE VESSEL EQUIPPED WITH THE CONTROL DEVICE

(75) Inventors: Shinnosuke Osafune, Nagasaki (JP); Yuji Ohta, Nagasaki (JP); Yoshimi Kagimoto, Nagasaki (JP); Akihiro Miyanagi, Hyogo (JP); Masahiko Mino, Nagasaki (JP); Yoshihiro Ichiki, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/133,441

(22) PCT Filed: Dec. 22, 2009

(86) PCT No.: PCT/JP2009/071265
§ 371 (c)(1),
(2), (4) Date: Jun. 30, 2011

(87) PCT Pub. No.: WO2010/074043
PCT Pub. Date: Jul. 1, 2010

(65) Prior Publication Data
US 2011/0257820 A1      Oct. 20, 2011

(30) Foreign Application Priority Data
Dec. 25, 2008   (JP) ................................ 2008-331596

(51) Int. Cl.
*B63H 21/14*   (2006.01)
(52) U.S. Cl. .......................................... 701/21; 440/84
(58) Field of Classification Search ............... 701/21; 440/84, 85, 86, 87; 60/39.182, 773
See application file for complete search history.

(56) References Cited

U.S. PATENT DOCUMENTS
8,033,878 B2 *  10/2011  Shibayama et al. ............ 440/87
(Continued)

FOREIGN PATENT DOCUMENTS
JP       63-068493       3/1988
JP       2004-051050     2/2004
(Continued)

OTHER PUBLICATIONS
International Search Report issued Mar. 30, 2010 in International (PCT) Application No. PCT/JP2009/071265.

*Primary Examiner* — Isam Alsomiri
(74) *Attorney, Agent, or Firm* — Wenderoth, Lind & Ponack, L.L.P.

(57) ABSTRACT

A ship powered by an internal combustion engine (1) and an electric motor (2) connected to a propeller (3) powered by surplus electric power obtained by a thermal discharge recovery system has a controller including a feedback control section for controlling a base amount of fuel injected to the internal combustion engine (1) based on the difference between the target number of rotation of the propeller given by the operator and the real number of rotation, and a feed-forward control section having a means (25) for calculating an overall power output and a means (26) for calculating a correction in the amount of fuel injected to the internal combustion engine based on the overall power output and the number of rotation of the propeller. The base amount of fuel is corrected by subtracting the correction obtained by the feed-forward section from the base amount of fuel calculated by the feedback control section whereby preventing a rapid change in the speed of the ship due to rapid change in ship loads.

5 Claims, 8 Drawing Sheets

U.S. PATENT DOCUMENTS

2009/0248227 A1* 10/2009 Kotou et al. .................... 701/21
2011/0004389 A1* 1/2011 Tanaka et al. ................. 701/100
2011/0270451 A1* 11/2011 Sakaguchi et al. ............ 700/288

FOREIGN PATENT DOCUMENTS

| | | |
|---|---|---|
| JP | 2007-1339 | 1/2007 |
| JP | 2008-126771 | 6/2008 |
| WO | 2007/124968 | 11/2007 |

* cited by examiner

CONTROL DEVICE FOR VESSEL EQUIPPED WITH EXHAUST HEAT RECOVERY SYSTEM AND THE VESSEL EQUIPPED WITH THE CONTROL DEVICE

BACKGROUND OF THE INVENTION

1. Field of the Invention

The present invention relates a control device for a vessel equipped with an exhaust heat recovery system and the vessel equipped with the control device. The exhaust heat recovery system comprises an internal combustion engine and a shaft generator connected to the internal combustion engine via a shaft and a feedback control device which performs feedback control of the rotation speed of the internal combustion engine based on the fuel injection amount needed for the internal combustion engine to a target rotation speed of the internal combustion engine.

2. Description of the Related Art

As an exhaust heat recovery system for vessels, there is a power generation system wherein a steam turbine is driven by performing heat exchange with exhaust gas discharged from a main engine with use of a exhaust gas economizer using the exhaust gas of the engine and a system wherein the power is generated by rotating the shaft generator by engine output so as to compensate for electric load within the vessel. These types of systems have been proposed in view of saving energy in the vessel. For instance, Patent Document 1 (JP2007-001339A) discloses the system wherein the exhaust gas of the engine is utilized to drive the gas turbine and to partially compensate for the electric load within the vessel.

In the energy recovery system equipped with the gas turbine, the distribution of the power is decided among a steam turbine, a gas turbine, and a shaft generator depending on the engine load.

Figure 7:
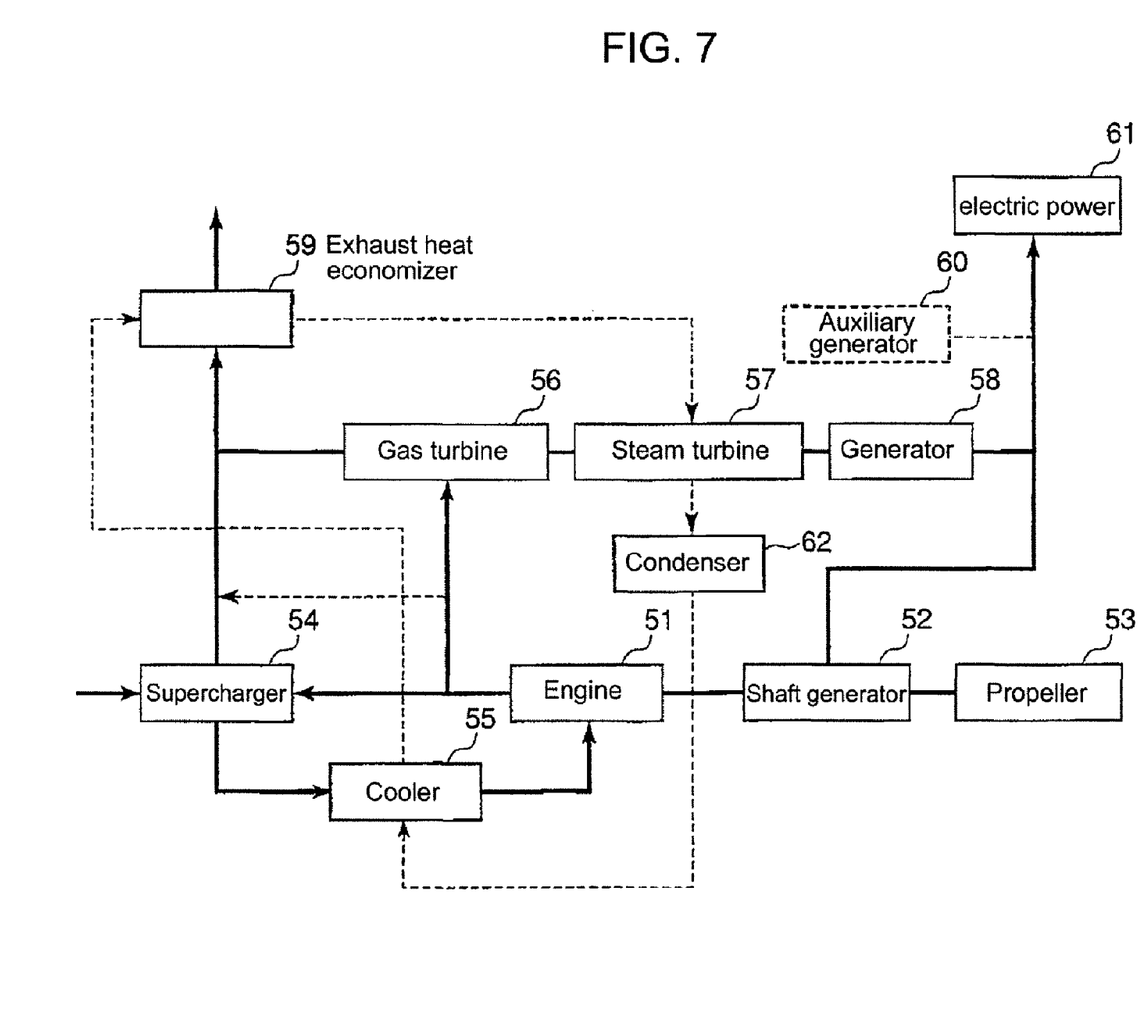
FIG. 7 A block diagram corresponding to FIG. 1 and illustrating a structure of a conventional exhaust heat recovery system.

A structure of a conventional exhaust heat recovery system equipped with a gas turbine is illustrated in FIG. 7. The conventional exhaust heat recovery system of FIG. 7 comprises an engine 51 for propelling the vessel, a shaft generator 52 for actuating the engine 51, a propeller 53 being rotated by the output of the engine 51, a supercharger 54 for compressing the air to be supplied to the engine 51, a cooler 55 for cooling the air from the supercharger 54, electric power 61 within the vessel generated by the shaft generator 52, generator 58, and an auxiliary generator 60.

Further, in the vessel, an exhaust gas economizer 59 is provided to generate steam. The exhaust gas discharged from the engine 71 is supplied to the exhaust gas economizer via the supercharger or the gas turbine 56. The steam obtained in the exhaust gas economizer 59 is used to actuate the steam turbine 57 and then the generator 58 is driven by the steam turbine 57 and the gas turbine 56.

The water and steam lines are indicated with dotted lines in FIG. 7. The steam returns to the water in a condenser 62 arranged on a downstream side of the steam turbine 57. Subsequently, the water is heated by the heat of the cooler and the heat used for cooling walls of the engine 51 and then supplied to the exhaust gas economizer 59. The water evaporates, thereby generating the steam.

In reference to FIG. 8, it is explained hereinafter how to control the fuel injection amount for the vessel equipped with the above exhaust heat recovery system.

Figure 8:
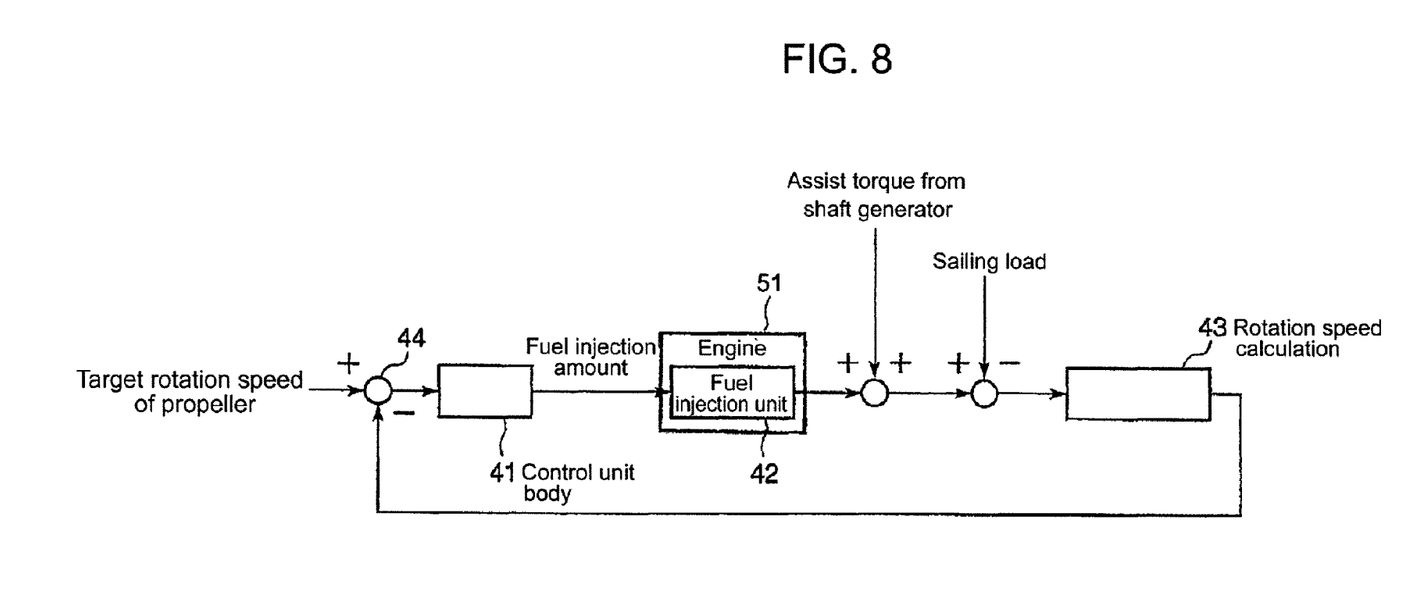
FIG. 8 A block diagram corresponding to FIG. 2 and illustrating a fuel injection amount control logic for the conventional vessel.

In FIG. 8, a target rotation speed of the propeller is given to a control unit 41. The control unit 41 converts the target rotation speed of the propeller into a fuel injection amount and sends the target fuel injection amount to a fuel injection device 42 of the engine. Next, assist torque from the shaft generator is added to an engine output corresponding to the fuel injection amount and then the vessel resistance is subtracted to perform calculation 43 of the rotation speed of the propeller. The difference between the target rotation speed of the propeller (the command rotation speed of the propeller sent from the operator) and the actual output of the propeller is obtained in the subtractor 44. The actual output of the propeller is corrected to the target rotation speed of the propeller having been subtracted. The corrected target rotation speed of the propeller is obtained based on the subtracted correction value by controlling the injection amount based on the corrected value having been subtracted. As a result, the propelling responsiveness of the vessel is improved.

In contrast, Patent Document 2 (JP2008-126771A) discloses a steering device for a vessel that improves a turning responsiveness of the vessel. According to Patent Document 2, the steering device for the vessel comprises a propulsion unit arranged at the stern thereof, a control unit for controlling thrust of the propulsion unit, and a turning unit being driven by an electric actuator for turning the vessel, an handle connected to the electric actuator electrically so as to send a drive signal in correspondence with the operation amount to the electric actuator and being operated by a vessel driver, wherein the control unit comprises at least one of a steering state detector for detecting a state of the handle operation, a running state detector for detecting a running state of the vessel, a propulsion unit state detector for finding a state of the propulsion unit such as the number of the units mounted on the vessel, and a actuator state detector for detecting a state of the electric actuator, and wherein the steering device further comprises a propulsion calculation unit for calculation a target propulsion based on a detection value obtained by at least one of the above units, and a propulsion control unit for controlling the propulsion of the propulsion unit according to the target propulsion calculated by the propulsion calculation unit.

However, the device of Patent Document 2 improves the turning responsiveness of the vessel and does not enhance the propelling responsiveness of the vessel or control the condition of the engine in response to the rotation speed of the propeller.

The engine output is determined by adding the propeller and the electric power within the vessel. In the past, the engine output, i.e. the fuel injection amount of the engine, was not controlled with consideration of both the propeller and the electric power within the vessel.

Further, the operator sends the command rotation speed of the propeller as a command so as to control the fuel injection amount of the engine based on the command rotation speed. Furthermore, a generator (a shaft generator) is arranged on the output shaft of the engine if necessary. The propeller is rotated on the engine shaft and thus the speed of the vessel is essentially determined by the rotation speed of the propeller, i.e. the rotation speed of the engine. However, the disturbance resistance such as the conditions of the wave is ultimately considered. In the past, the fuel injection amount was adjusted in an engine room of the vessel to achieve a target vessel speed. And the engine control was not performed with consideration of the vessel speed.

In the vessel with the exhaust heat recovery system, the electric power is supplied by the gas turbine, the steam turbine, the shaft generator and so on. Thus, when the rapid drop in the load within the vessel generates surplus electricity, the shaft generator is used as a generator so as to consume the surplus electricity and also to assist the driving power of the vessel. Therefore, when the rapid drop in the load within the vessel generates surplus electricity, there is torque turbulence of the assist torque from the shaft and thus the vessel is rapidly accelerated.

RELATED PATENT DOCUMENT

Patent Document

[PATENT DOCUMENT 1] JP2007-1339A
[PATENT DOCUMENT 2] JP2008-126771A

SUMMARY OF THE INVENTION

In view of the problems above, an object of the present invention is to provide a control device for a vessel equipped with an exhaust heat recovery system and the vessel equipped with the control device which can suppress change of the vessel speed due to the rapid drop in the load within the vessel with improved responsiveness.

To solve the problems above, the present invention proposes a control device for a vessel which is equipped with an exhaust heat recovery system and comprises an internal combustion engine, a shaft generator 2 connected to the internal combustion engine 1 by an output shaft 1a, an engine output unit for transmitting output of the internal combustion engine 1 and the shaft generator 2 to a propeller 3, and the exhaust heat recovery system 9, 6, 7, 12 for the vessel including the internal combustion engine 1, the control device comprising: a feedback controller 24 which controls a fuel injection amount needed for the internal combustion engine 1 based on a difference between a target rotation speed of the propeller set by a vessel operator and an actual rotation speed of the propeller so as to obtain a standard fuel injection amount having been subjected to feedback control; and a feedforward controller 25, 26 which comprises a power surplus state detector 30 for detecting surplus power generated in the exhaust heat recovery system and determining whether or not there is power surplus, an engine output calculation unit 25 for calculating an engine output for driving the propeller 3 from an output of the shaft generator 2 functioning as an electric motor by the surplus power, and a correction value calculation unit 26 for calculating a first correction value of the fuel injection amount for the internal combustion engine based on the engine output and an engine rotation speed, wherein the standard fuel injection amount is corrected by subtracting the first correction value obtained from the feedforward controller 25, 26 from the standard fuel injection amount obtained from the feedback controller 24.

According to the invention, the standard fuel injection amount is corrected by subtracting the first correction value obtained from the feedforward controller 25, 26 from the standard fuel injection amount obtained from the feedback controller 24 so that the fuel injection amount can be corrected in response to the surplus power due to the rapid drop in the load within the vessel. As a result, the fuel injection amount can be controlled to meet the target rotation speed when the load within the vessel decreases rapidly, and thus the change of the vessel speed can be controlled with better responsiveness.

Further, it is preferable that the feedback controller comprises a control unit having conversion information to convert the target rotation speed of the propeller into the standard fuel injection amount needed for the internal combustion engine based on the difference between the target rotation speed of the propeller set by the vessel operator and the actual rotation speed of the propeller, and a correction unit for correcting the standard fuel injection amount obtained from the control unit by the first correction value.

By this, the fuel injection amount of the internal combustion engine can be adjusted and the change of the vessel speed can be controlled so as to achieve the target rotation speed of the propeller even when the load within the vessel decreases. As a result, the system itself can be simplified as well.

Furthermore, it is also preferable that the feedback controller comprises a control unit for performing the feedback control of the standard fuel injection amount needed for the internal combustion engine based on both the difference between the target rotation speed of the propeller set by the vessel operator and the actual rotation speed of the propeller and a difference between a target vessel speed set by the operator and actual vessel speed, and a correction unit for correcting the standard fuel injection amount obtained from the control unit by the first correction value.

In this manner, the vessel speed can be directly adjusted to the target vessel speed by considering both the rotation speed and the vessel speed.

As a vessel equipped with the exhaust heat recovery system, the present invention proposes a vessel which is equipped with an exhaust heat recovery system and comprises an internal combustion engine, a shaft generator connected to the internal combustion engine by an output shaft, a propeller rotated by output of the internal combustion engine via the shaft generator, and the exhaust heat recovery system for the vessel and the internal combustion engine, the vessel comprising: a feedback controller which controls a fuel injection amount needed for the internal combustion engine based on a difference between a target rotation speed of the propeller set by a vessel operator and an actual rotation speed of the propeller so as to obtain a standard fuel injection amount having been subjected to feedback control; and a feedforward controller which comprises a power surplus state detector for detecting surplus power generated in the exhaust heat recovery system and determining whether or not there is surplus power, an engine output calculation unit for calculating an engine output for driving the propeller from an output of the shaft generator functioning as an electric motor by the surplus power, and a correction value calculation unit for calculating a first correction value of the fuel injection amount for the internal combustion engine based on the engine output and an engine rotation speed, wherein the standard fuel injection amount is corrected by subtracting the first correction value obtained from the feedforward controller from the standard fuel injection amount obtained from the feedback controller.

By this, the vessel having the control device equipped with the exhaust heat recovery system can suppress the change of the vessel speed with better responsiveness when the load within the vessel decreases rapidly.

Moreover, it is preferable that the feedback controller comprises a control unit for performing feedback control of the standard fuel injection amount needed for the internal combustion engine based on both the difference between the target rotation speed of the propeller set by the vessel operator and the actual rotation speed of the propeller and a difference of vessel speed between a target vessel speed set by the operator and actual vessel speed, and a correction unit for correcting the standard fuel injection amount obtained from the control unit by the first correction value.

According to the present invention, it is possible to provide the control device for the vessel equipped with the exhaust heat recovery system and the vessel equipped with the control device that can suppress change of the vessel speed due to the rapid drop in the load within the vessel with improved responsiveness.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

Figure 1:
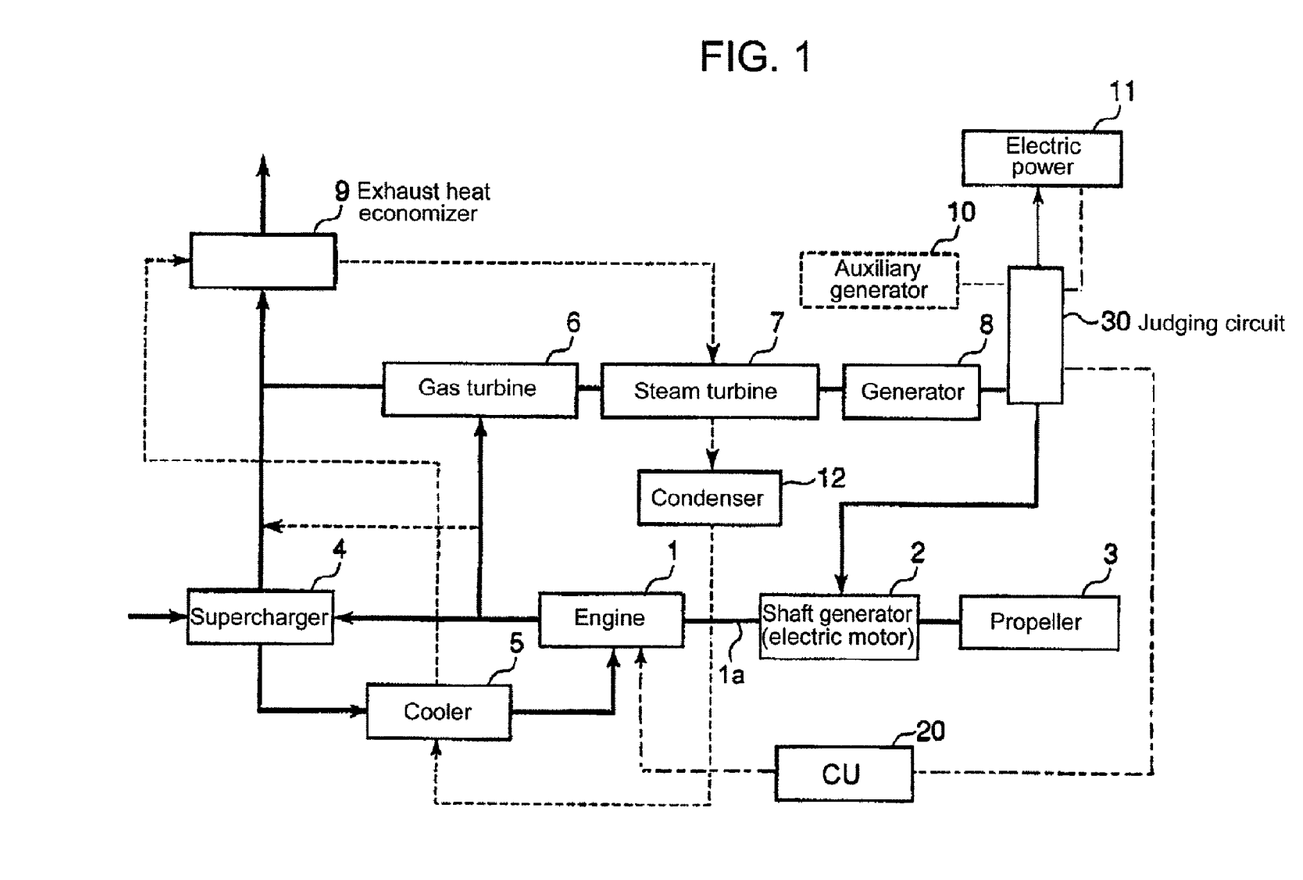
FIG. 1 A block diagram illustrating a general structure of a vessel equipped with an exhaust heat recovery system to which the present invention is applied.

First, controlling of the fuel injection amount of the vessel relating to a first preferred embodiment will be explained in reference to FIG. 1 to FIG. 4. FIG. 1 is a block diagram illustrating a general structure of a vessel equipped with an exhaust heat recovery system to which the present invention is applied. The exhaust heat recovery system of FIG. 1 has an engine (internal combustion engine) 1 for propelling the vessel, a shaft generator 2 connected to the engine 1 by an output shaft, a propeller 3 being rotated by the output of the engine 1, a supercharger 4 for compressing the air supplied to the engine 1, a cooler 5 for cooling the air from the supercharger 4, a generator 8, an auxiliary generator 10, and electric power 11 within the vessel supplied by the shaft generator 2, the generator 8 and the auxiliary generator 10. Further, the drawings illustrate the state in which there is surplus power due to less usage of the electric power within the vessel. A portion of the power by the generator 8 is supplied to the shaft generator 2 as surplus power, which is indicated by a heavy line.

In general, vessels are equipped with the exhaust heat economizer 9. The exhaust gas discharged from the engine is supplied to the exhaust gas economizer 9 via the supercharger 4 or a gas turbine 6. Then the steam generated in the exhaust gas economizer actuates the steam turbine 7 and rotates the generator 8 together with input of the gas turbine 6.

Herein, the exhaust gas economizer is a device specifically for vessels and for instance, mounted inside a chimney of the vessel. In such a case, heat exchange pipes are tightly installed in the chimney, in which the water is introduced so that heat exchange is performed between the water and the exhaust gas discharged from the main engine. In this manner, the device generates the steam and heats the water.

The dotted lines shown in FIG. 1 indicate supply lines of the steam and the water. The steam is returned to the water in a condenser 12 arranged on a downstream side of the steam turbine 7. The water is heated by the heat of the cooler and the heat used for cooling walls of the engine and then supplied to the exhaust gas economizer 9 where the water is evaporated to generate the steam.

In the above described exhaust heat recovery system, the power for the entire ship is supplied by the generator 8 connected to the gas turbine 6 and the steam turbine 7, the shaft generator 2, and the auxiliary generator 10. Thus, when the load of the vessel rapidly decreases and the surplus power is generated, the power is supplied to the shaft generator 2 and the shaft generator functions as an electric motor to consume the surplus power and assist the navigating power of the engine 1 as shown in FIG. 1. Specifically, in a judging circuit 30, it is determined whether or not there is surplus power equal to the threshold or less by using the following formula:

{(Generator 8+Shaft generator 2+Auxiliary generator 10)−(Power needed within the vessel+Threshold)=Surplus power If it is determined that there is surplus power of not less than the threshold, the power is supplied to the shaft generator so that the shaft generator 2 can function as an electric motor to assist the output of the propeller.

In this manner, the surplus power can be utilized but this can also cause assist torque turbulence from the shaft generator and as a result, the vessel whose desired speed is constant, accelerates rapidly.

Figure 2:
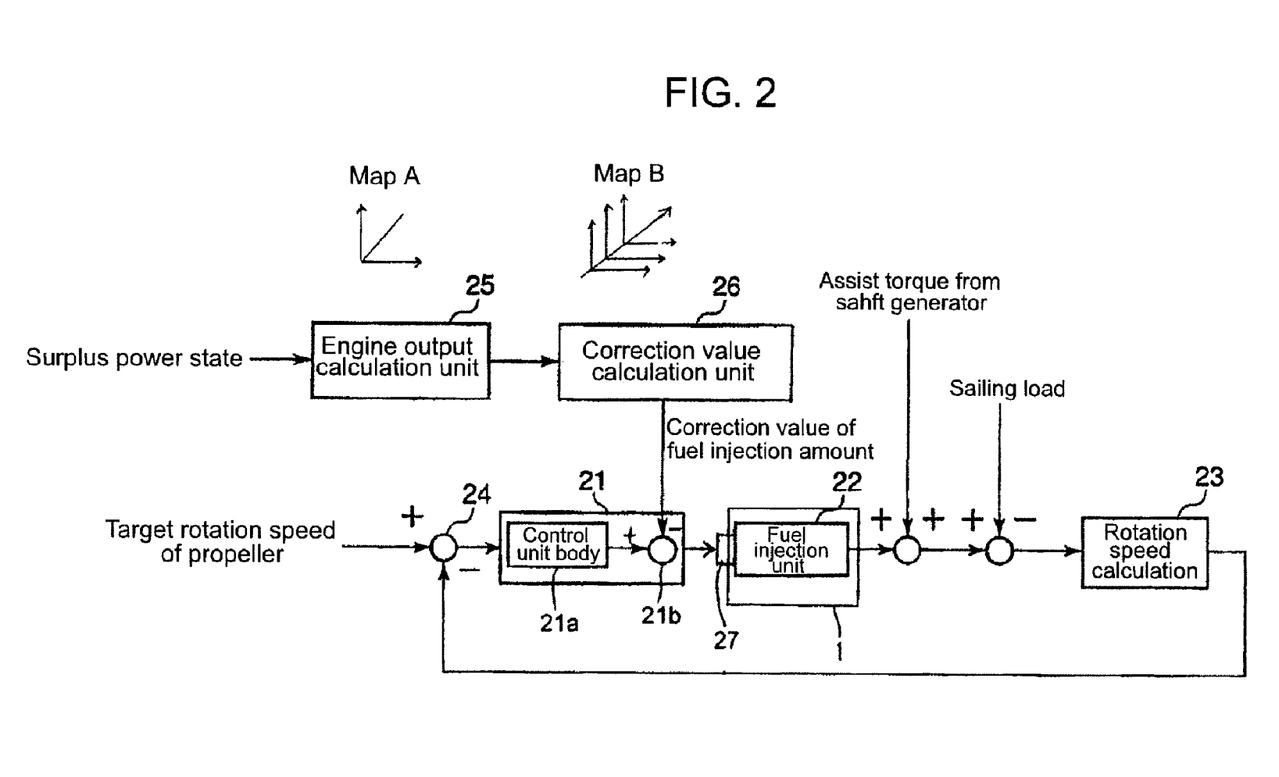
FIG. 2 A block diagram illustrating main components for controlling a fuel injection amount for the vessel of FIG. 1 as a first preferred embodiment in which the component are housed in the control unit of FIG. 1.
Figure 3:
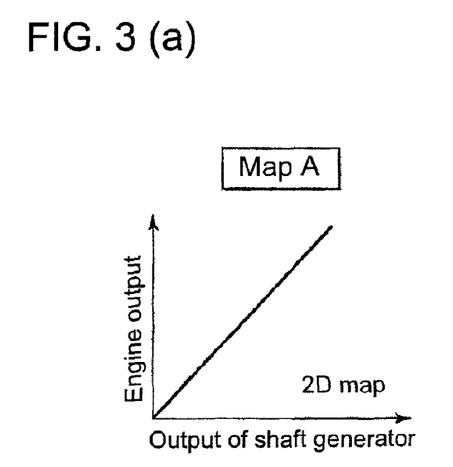
FIG. 3(a) is a 2D map from which engine output corresponding to output of an shaft generator can be obtained. The 2D map has the output of the shaft generator on the x-axis and the engine output on the y-axis.
FIG. 3(b) is a 3D map from which the fuel injection amount corresponding to the rotation speed of the engine and the engine output can be obtained.

In view of this issue, the present invention proposes to perform the following control illustrated in FIG. 2.

FIG. 2 is a block diagram illustrating main components for controlling a fuel injection amount for the vessel of FIG. 1 as a first preferred embodiment in which the component are housed in the control unit of FIG. 1. As shown in FIG. 2, once a control unit 21 receives a target rotation speed of the propeller which is set based on the a rotation speed requested by a vessel operator, a control unit body 21a of the control unit 21 converts the target rotation speed of the propeller into a standard fuel injection amount. Next, a correction unit 21b corrects the standard fuel injection amount based on a correction value which will be described later. The standard fuel injection amount having been corrected is given to an actuator 27 of a fuel injection unit 22 of the engine.

Meanwhile, the judging circuit 30 detects an amount of the surplus power generated due to the rapid decline in the load within the vessel. When it is determined that there is surplus power, an engine output calculation unit 25 of FIG. 2 calculates engine output from the map A of FIG. 3(a) which will be described alter. The engine output corresponds to output of the shaft generator. Herein, the engine output is the sum of output of the internal combustion engine and the output of the shaft generator functioning as the electric motor (assist torque). With the map A, the engine output corresponding to the output of the shaft generator can be calculated. The map is 2D map with the output of the shaft generator on X-axis and the engine output on Y-axis. The engine output can be easily obtained by inputting the output of the shaft generator in the map.

And a correction value calculation unit 26 calculates a correction value of the fuel injection amount which corresponds to the engine output and an engine rotation speed. Specifically, the correction value of the fuel injection amount corresponding to the engine output can be calculated by inputting the engine rotation speed for the engine output obtained from the map A.

The correction unit 21b subtracts the correction value of the fuel injection amount obtained from the surplus power from the standard fuel injection amount obtained form the control unit body 21a so as to obtain a corrected target fuel injection amount. The corrected fuel injection amount is fed to the actuator 27 of the fuel injection unit 22. In this manner, the control of correcting the fuel injection amount (corrected fuel injection amount) to be ultimately supplied to the internal combustion engine is performed by a feedforward control as described above.

Further, the internal combustion engine 1 of FIG. 2 is a mechanically controlled engine having an actuator for controlling the fuel injection amount mechanically. For instance, a fuel injection amount adjustor of a rack type can be used. An electronically-controlled engine of an electronic governor type may be used to control the fuel injection amount by an electronic signal.

Next, the output of the internal combustion engine corresponding to the corrected fuel injection amount to be supplied to the internal combustion engine and the assist torque from the shaft generator are added. And the sailing load such as the vessel resistance is subtracted and then rotation speed calculation 23 is performed to obtain the rotation speed of the engine (propeller). Finally, a subtractor 24 calculates a difference between the target rotation speed and the actual rotation speed of the propeller.

Further, the engine output calculation unit 25 and the correction value calculation unit 26 use the map A and the map B that are prepared in advance. The map A of FIG. 3(a) is a two-dimensional map and used to calculate the engine output corresponding to the output of the shaft generator 2 (ref. FIG. 1). Furthermore, the map B of FIG. 3(b) is a three-dimensional map and used to calculate the fuel injection amount corresponding to both the engine output and the engine rotation speed.

In this manner, by directly detecting the output of the shaft generator, the fuel injection amount can be easily calculated from the map A of FIG. 3(a) and the map B of FIG. 3(b). It is also possible to sequentially calculate the fuel injection amount by using a formula with a conversion factor, instead of calculating by using the maps.

Figure 4:
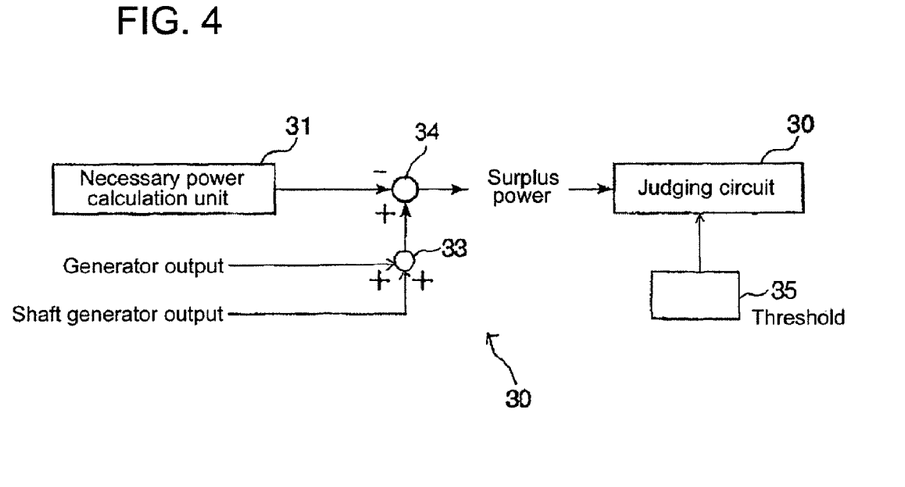
FIG. 4 A block diagram illustrating a power surplus state detector for a judging circuit of FIG. 1.

The judging circuit 30 for determining the surplus power state of FIG. 1 is illustrated in FIG. 4.

The power within the vessel is supplied by the generator connected to the gas turbine 6 and the steam turbine 7, and the shaft generator 2. Moreover, the auxiliary generator 10 is actuated normally when the internal combustion engine (main engine) stops.

In the judging circuit 30, a necessary power calculation unit 31 calculates the power necessary for the vessel by detecting voltage and current of each electronic device within the vessel. Meanwhile, in the vessel equipped with the exhaust heat recovery system, an adder 33 calculates a power supply amount by adding the output of the generator 8 and the output of the shaft generator 2 and in some cases, the auxiliary generator 10 as well. Therefore, the surplus power can be obtained in the judging circuit 30 by subtracting the necessary power for the vessel from the power supply amount. Further, a surplus power state detection unit 36 determines a surplus power state by comparing the surplus power having been obtained and a threshold 35 having been set in advance. When the surplus power having been obtained exceeds the threshold, the judging circuit 30 determines that there is surplus power. Once it is determined in the judging circuit 30 that the vessel is in the power surplus state, the above-mentioned control shown in FIG. 2 is performed.

In this manner, when it is determined that there is surplus power as illustrated in FIG. 4, the feedforward control is performed to correct the fuel injection amount of the internal combustion engine to achieve the target rotation speed of the propeller, resulting in suppressing the change of the vessel speed even when the load within the vessel decreases rapidly.

Second Preferred Embodiment

Figure 5:
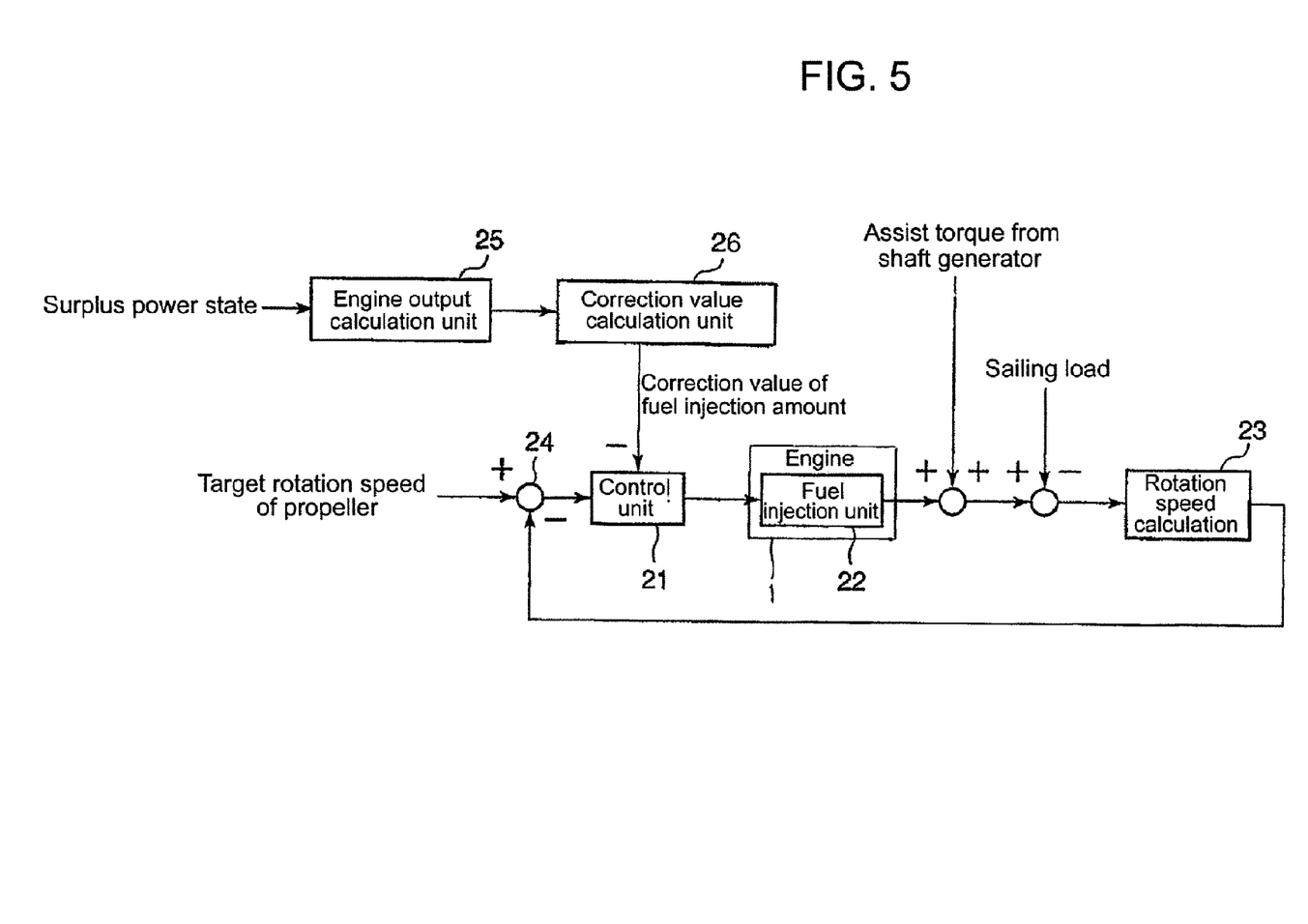
FIG. 5 A block diagram illustrating components of a fuel injection amount control logic for the vessel of FIG. 1 as a second preferred embodiment in which the component are housed in the control unit of FIG. 1.

Now, a fuel injection amount control in relation to a second preferred embodiment is explained in reference to FIG. 5. The general structure of the exhaust heat recovery system of the second preferred embodiment is similar to that of FIG. 1 and thus the structure thereof is not explained further. Further, in the second preferred embodiment, an electronically-controlled engine which controls the fuel injection electronically by an electronic governor or the like is used as the internal combustion engine 1.

FIG. 5 is a block diagram illustrating components of the fuel injection amount control logic for the vessel in relation to the second preferred embodiment. While the mechanical actuators are used as the control units for controlling the fuel injection in FIG. 2, the electronically-controlled engine is used to control the fuel injection electronically by the electronic governor or the like in FIG. 5.

In FIG. 5, the target rotation speed of the propeller is obtained from the requested rotation speed of the propeller set by the vessel operator. Then the control unit 21 converts the target rotation speed of the propeller into the standard fuel injection amount. Next, the standard fuel injection amount is corrected based on the correction value calculated in the control unit body 21a of the control unit 21 converts the target rotation speed of the propeller into a standard fuel injection amount. Next, a correction unit 21b corrects the standard fuel injection amount based on the correction value calculated in the engine output calculation unit 26 and the correction value calculation unit 26. Then, the opening of the electronic governor of the fuel injection unit 22 is controlled based on the corrected fuel injection amount. In this case, as the electronic governor for electronically controlling the fuel injection of the internal combustion engine is electronically controlled, both the standard fuel injection amount and the fuel injection amount correction value are subjected to A/D conversion to be calculated as digitally converted information so as to obtain the corrected fuel injection amount.

Hereinafter, to briefly explain FIG. 5, the amount of the surplus power generated due to the rapid decline in the load within the vessel is detected and once it is determined that there is surplus power, the engine output calculation unit 25 calculates the engine output corresponding to the output of the shaft turbine. Next, the fuel injection correction value corresponding to both the rotation speed of the engine and the engine output is calculated in the correction value calculation unit 26. In a similar manner to the first preferred embodiment, once the power surplus is detected, the calculation of the engine output and the fuel injection correction value are obtained from the map A and the map B.

The fuel injection correction value obtained by the surplus power by performing the feedforward control is inputted to the control unit 21 so as to obtain the fuel injection amount having been corrected by subtracting the fuel injection amount correction value from the fuel injection amount calculated from the rotation speed of the propeller, input the target fuel injection having been corrected, and finally control the fuel injection amount ultimately to be fed to the engine.

Next, the assist torque from the shaft generator is added to the fuel injection amount and then the sailing load such as the vessel resistance is subtracted from the fuel injection amount. Subsequently, the rotation speed calculation 23 is performed. The subtractor calculates the difference between the target rotation speed having been fed back and the actual output of the propeller.

In this manner, in the case of using the electronically-controlled engine, it is possible to use the control logic of the first preferred embodiment (ref. FIG. 2) and further it is also possible to use fuel injection information having been prepared beforehand in the control unit 21 which is the governor of the main engine.

Thus, in a manner similar to the first preferred embodiment, when it is determined that there is surplus power, the fuel injection amount of the internal combustion engine can be adjusted and the change of the vessel speed can be controlled so as to achieve the target rotation speed of the propeller even when the load within the vessel decreases. As a result, the fuel injection amount can be sent to the actuator with one signal line and thus the system itself can be simplified as well.

Third Preferred Embodiment

Figure 6:
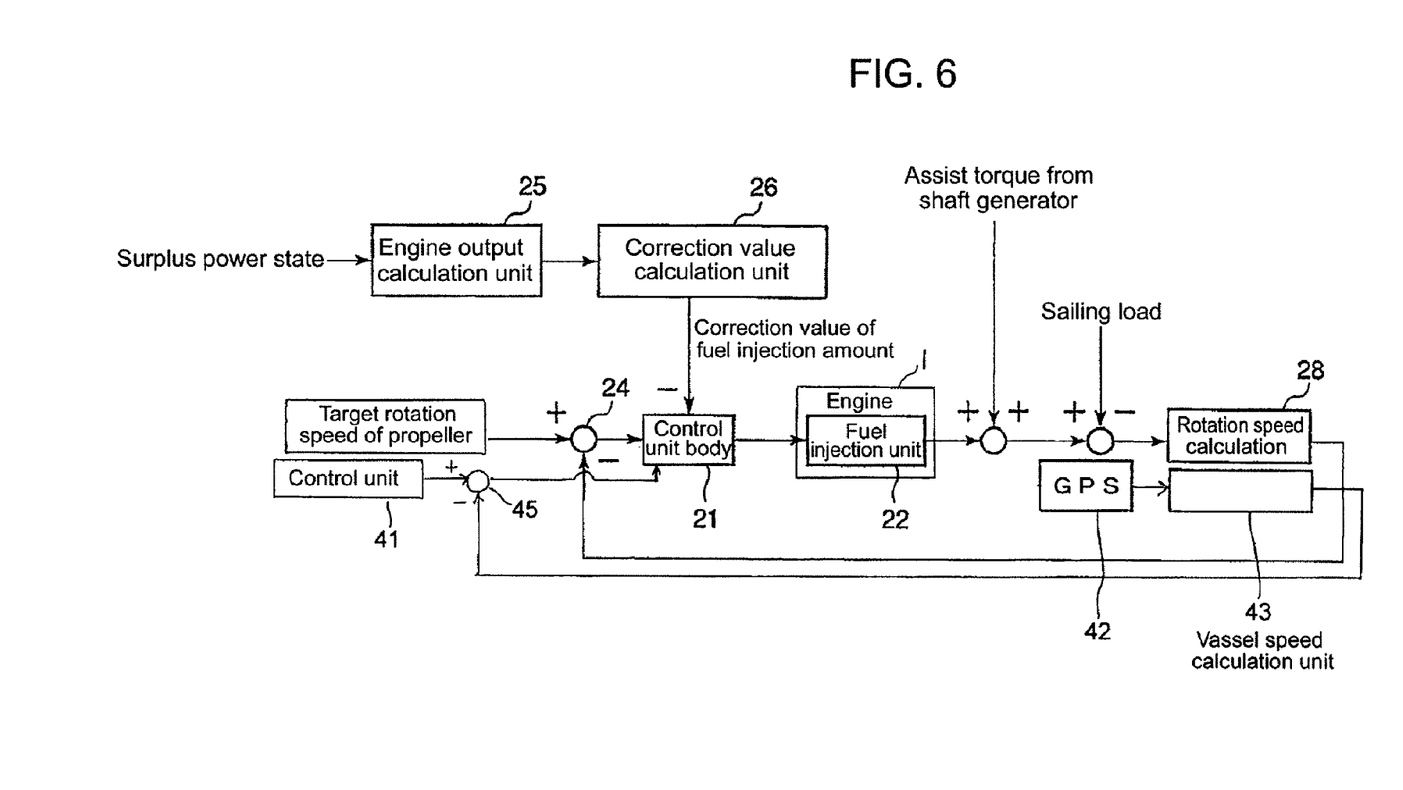
FIG. 6 A block diagram illustrating components of a fuel injection amount control logic for the vessel of FIG. 1 as a third preferred embodiment in which the component are housed in the control unit of FIG. 1.

Now, a fuel injection amount control in relation to a third preferred embodiment is explained in reference to FIG. 6. The general structure of the exhaust heat recovery system of the second preferred embodiment is similar to that of FIG. 1 and thus the structure thereof is not explained further. Further, in the third preferred embodiment, an electronically-controlled engine, which controls the fuel injection electronically, is used as the internal combustion engine 1 in the same manner as the second preferred embodiment.

In the third preferred embodiment, the vessel speed is directly controlled to the target speed requested by the vessel operator. The control logic thereof is illustrated in FIG. 6.

Different from FIG. 5, FIG. 6 shows a GPS 42 for locating the vessel, a vessel speed calculation unit 43 for calculating an actual output of the vessel speed from data from the GPS, a vessel speed setting unit 44 for setting the target vessel speed based on the request from the vessel operator, and a difference calculation unit 45 for calculating a difference between the target vessel speed and the actual vessel speed. Based on the signal from the difference calculation unit, the vessel speed is detected by the GPS and the change of the vessel speed is suppressed such that the speed remains constant. Further, a first correction fuel injection amount having corrected in the control unit 21 is further corrected so as to obtain a second correction fuel injection amount which has the change of the vessel speed into consideration.

In FIG. 6, once the requested rotation speed of the vessel and the requested vessel speed are set by the vessel operator, the requested rotation speed of the engine and the requested vessel speed are subjected to the first and second correction in the control unit 21 to be converted in the signal corresponding to the target fuel injection amount. The opening of the electric governor of the fuel injection unit 22 is controlled based on the signal corresponding to the corrected fuel injection amount.

When the electronically-controlled engine is used as the engine 1, the conversion information of the fuel injection amount and the vessel speed detected by the GPS can be inputted in the control unit 21.

In a manner similar to the first and second preferred embodiments, the amount of the surplus power generated due to the rapid decline in the load within the vessel is detected and once it is determined that there is surplus power, the engine output calculation unit 25 calculates the engine output corresponding to the output of the shaft turbine. Next, the fuel injection correction value corresponding to the rotation speed of the engine and the engine output is calculated in the correction value calculation unit 26. In a similar manner to the first preferred embodiment, once the surplus power is detected, the calculation of the engine output and the fuel injection correction value are obtained from the map A and the map B. In the third preferred embodiment, the target fuel injection amount is corrected by both the first fuel injection amount correction value obtained by the surplus power in the feedforward control and the second fuel injection amount correction value calculated based on the change of the vessel speed. And the target fuel injection amount having been corrected is sent to the fuel injection unit 22 of the engine 1 so as to control the fuel injection amount to be supplied to the engine 1.

Next, the assist torque from the shaft generator is added to the fuel injection amount and then the sailing load such as the vessel resistance is subtracted from the fuel injection amount. Subsequently, the rotation speed calculation 23 is performed. The subtractor 24 calculates the difference between the target rotation speed having been fed back and the actual output of the propeller. And the difference between the target vessel speed and the actual vessel speed is obtained in a similar manner. Specifically, the vessel speed is detected and the fuel injection amount is controlled so as to control the engine rotation such that the vessel speed becomes constant while suppressing the change of the vessel speed.

Thus, in a manner similar to the first and second preferred embodiments, when it is determined that there is surplus power, the fuel injection amount of the internal combustion engine can be controlled and the change of the vessel speed can be controlled so as to achieve the target rotation speed of the propeller even when the load within the vessel decreases. Moreover, the detected vessel speed is loaded in the control unit so as to directly adjust the vessel speed to the requested vessel speed requested by the vessel operator while in the conventional case, the fuel injection amount is adjusted while the vessel operator visually detects the vessel speed to adjust the rotation speed of the propeller.

Although it is not shown in the drawings, in a manner similar to the first preferred embodiment, the fuel injection amount obtained from the surplus power and the fuel injection amount calculated from the rotation speed and the vessel speed are sent to the actuator, and further the target fuel injection amount obtained from the surplus power is corrected by subtracting the fuel injection amount calculated from the rotation speed and the vessel speed from the fuel injection amount obtained from the surplus power, and furthermore the corrected fuel injection amount is sent to the engine 1 so as to ultimately control the fuel injection amount to be supplied to the engine 1.

INDUSTRIAL APPLICABILITIES

According to the present invention, the control device for the vessel equipped with the exhaust heat recovery system

The invention claimed is:

1. A control device for a vessel which is equipped with an exhaust heat recovery system and comprises an internal combustion engine, a shaft generator connected to the internal combustion engine by an output shaft, an engine output unit for transmitting output of the internal combustion engine and the shaft generator to a propeller, and the exhaust heat recovery system for the vessel including the internal combustion engine, the control device comprising:

a feedback controller which controls a fuel injection amount needed for the internal combustion engine based on a difference between a target rotation speed of the propeller set by a vessel operator and an actual rotation speed of the propeller so as to obtain a standard fuel injection amount having been subjected to feedback control; and a feedforward controller which comprises a power surplus state detector for detecting surplus power generated in the exhaust heat recovery system and determining whether or not there is surplus power, an engine output calculation unit for calculating an engine output for driving the propeller from an output of the shaft generator functioning as an electric motor by the surplus power, and a correction value calculation unit for calculating a first correction value of the fuel injection amount for the internal combustion engine based on the engine output and an engine rotation speed, wherein the standard fuel injection amount is corrected by subtracting the first correction value obtained from the feedforward controller from the standard fuel injection amount obtained from the feedback controller.

2. The control device for the vessel equipped with the exhaust heat recovery system according to claim 1, wherein the feedback controller comprises a control unit having conversion information to convert the target rotation speed of the propeller into the standard fuel injection amount needed for the internal combustion engine based on the difference between the target rotation speed of the propeller set by the vessel operator and the actual rotation speed of the propeller, and a correction unit for correcting the standard fuel injection amount obtained from the control unit by the first correction value.

3. The control device for the vessel equipped with the exhaust heat recovery system according to claim 1, wherein the feedback controller comprises a control unit for performing the feedback control of the standard fuel injection amount needed for the internal combustion engine based on both the difference between the target rotation speed of the propeller set by the vessel operator and the actual rotation speed of the propeller and a difference between a target vessel speed set by the operator and actual vessel speed, and a correction unit for correcting the standard fuel injection amount obtained from the control unit by the first correction value.

4. A vessel which is equipped with an exhaust heat recovery system and comprises an internal combustion engine, a shaft generator connected to the internal combustion engine by an output shaft, a propeller rotated by output of the internal combustion engine via the shaft generator, and the exhaust heat recovery system for the vessel and the internal combustion engine, the vessel comprising:

a feedback controller which controls a fuel injection amount needed for the internal combustion engine based on a difference between a target rotation speed of the propeller set by a vessel operator and an actual rotation speed of the propeller so as to obtain a standard fuel injection amount having been subjected to feedback control; and a feedforward controller which comprises a power surplus state detector for detecting surplus power generated in the exhaust heat recovery system and determining whether or not there is surplus power, an engine output calculation unit for calculating an engine output for driving the propeller from an output of the shaft generator functioning as an electric motor by the surplus power, and a correction value calculation unit for calculating a first correction value of the fuel injection amount for the internal combustion engine based on the engine output and an engine rotation speed, wherein the standard fuel injection amount is corrected by subtracting the first correction value obtained from the feedforward controller from the standard fuel injection amount obtained from the feedback controller.

5. The vessel equipped with the exhaust gas heat recovery system according to claim 4, wherein the feedback controller comprises a control unit for performing feedback control of the standard fuel injection amount needed for the internal combustion engine based on both the difference between the target rotation speed of the propeller set by the vessel operator and the actual rotation speed of the propeller and a difference of vessel speed between a target vessel speed set by the operator and actual vessel speed, and a correction unit for correcting the standard fuel injection amount obtained from the control unit by the first correction value.

* * * * *